(12) United States Patent
Lobert et al.

(10) Patent No.: US 9,051,424 B2
(45) Date of Patent: Jun. 9, 2015

(54) PROCESS FOR PREPARING BRANCHED POLYETHERCARBONATES AND USE THEREOF

(75) Inventors: Matthias Lobert, Essen (DE); Sarah Schmitz, Duisburg (DE); Frank Schubert, Neukirchen-Vluyn (DE); Roland Hubel, Essen (DE); Helmut Hahnel, Duisburg (DE)

(73) Assignee: EVONIK DEGUSSA GMBH, Essen (DE)

( * ) Notice: Subject to any disclaimer, the term of this patent is extended or adjusted under 35 U.S.C. 154(b) by 0 days.

(21) Appl. No.: 14/236,664

(22) PCT Filed: Jul. 4, 2012

(86) PCT No.: PCT/EP2012/062959
§ 371 (c)(1),
(2), (4) Date: Feb. 3, 2014

(87) PCT Pub. No.: WO2013/017360
PCT Pub. Date: Feb. 7, 2013

(65) Prior Publication Data
US 2014/0179894 A1      Jun. 26, 2014

(30) Foreign Application Priority Data
Aug. 3, 2011 (DE) .................. 10 2011 109 614

(51) Int. Cl.
| | | |
|---|---|---|
| *C08G 64/00* | (2006.01) | |
| *C08G 65/26* | (2006.01) | |
| *C08G 65/331* | (2006.01) | |
| *C08G 64/18* | (2006.01) | |
| *C08G 75/00* | (2006.01) | |

(52) U.S. Cl.
CPC ............ *C08G 65/2603* (2013.01); *C08G 65/26* (2013.01); *C08G 65/331* (2013.01); *C08G 64/183* (2013.01)

(58) Field of Classification Search
CPC .................................................. C08G 65/2603
USPC ........................................................ 528/370
See application file for complete search history.

(56) References Cited

U.S. PATENT DOCUMENTS

| | | |
|---|---|---|
| 8,247,525 B2 | 8/2012 | Schubert et al. |
| 8,268,939 B2 | 9/2012 | Ebbrecht et al. |
| 8,324,325 B2 | 12/2012 | Knott et al. |
| 8,450,514 B2 | 5/2013 | Schubert et al. |
| 2009/0137752 A1 | 5/2009 | Knott et al. |
| 2010/0071849 A1 | 3/2010 | Knott et al. |
| 2010/0105843 A1 | 4/2010 | Knott et al. |
| 2010/0184871 A1 | 7/2010 | Bevinakatti et al. |
| 2010/0184913 A1 | 7/2010 | Ebbrecht et al. |
| 2010/0266518 A1 | 10/2010 | Springer et al. |
| 2011/0039948 A1 | 2/2011 | Lange et al. |
| 2011/0042004 A1 | 2/2011 | Schubert et al. |
| 2011/0046305 A1 | 2/2011 | Schubert et al. |
| 2011/0185947 A1 | 8/2011 | Jaunky et al. |
| 2011/0245412 A1 | 10/2011 | Schubert et al. |
| 2011/0294933 A1 | 12/2011 | Jaunky et al. |
| 2012/0028022 A1 | 2/2012 | Brugger et al. |
| 2012/0029090 A1 | 2/2012 | Brugger et al. |
| 2012/0037036 A1 | 2/2012 | Veit et al. |
| 2012/0067520 A1 | 3/2012 | Schubert et al. |
| 2012/0068110 A1 | 3/2012 | Schubert et al. |
| 2012/0071564 A1 | 3/2012 | de Gans et al. |
| 2012/0296125 A1 | 11/2012 | Schubert et al. |
| 2013/0035408 A1 | 2/2013 | Knott et al. |
| 2013/0035409 A1 | 2/2013 | Hubel et al. |
| 2013/0237616 A1 | 9/2013 | Ferenz et al. |
| 2013/0245304 A1 | 9/2013 | Schubert et al. |

FOREIGN PATENT DOCUMENTS

| | | |
|---|---|---|
| EP | 2 194 086 | 6/2010 |
| EP | 2 196 487 | 6/2010 |
| WO | WO 2009/016375 | 2/2009 |
| WO | WO 2009/112418 | 9/2009 |
| WO | WO 2010/003610 | 1/2010 |
| WO | WO 2010/003611 | 1/2010 |
| WO | WO 2010/063531 | 6/2010 |

OTHER PUBLICATIONS

Rokicki, G. et al., "Hyperbranched aliphatic polyethers obtained from environmentally benign monomer: glycerol carbonate", Green Chemistry, May 10, 2005, vol. 5, pp. 529-593, Royal Society of Chemistry, Cambridge, GB.
International Search Report(and English Translation thereof), PCT/EP2012/062959, mailed Sep. 9, 2012.

*Primary Examiner* — Terressa Boykin
(74) *Attorney, Agent, or Firm* — Frommer Lawrence & Haug LLP

(57) ABSTRACT

The present invention relates to a process for preparing branched polyethers and/or polyether-like structures, to these branched polyethers themselves, and to their use.

14 Claims, 1 Drawing Sheet

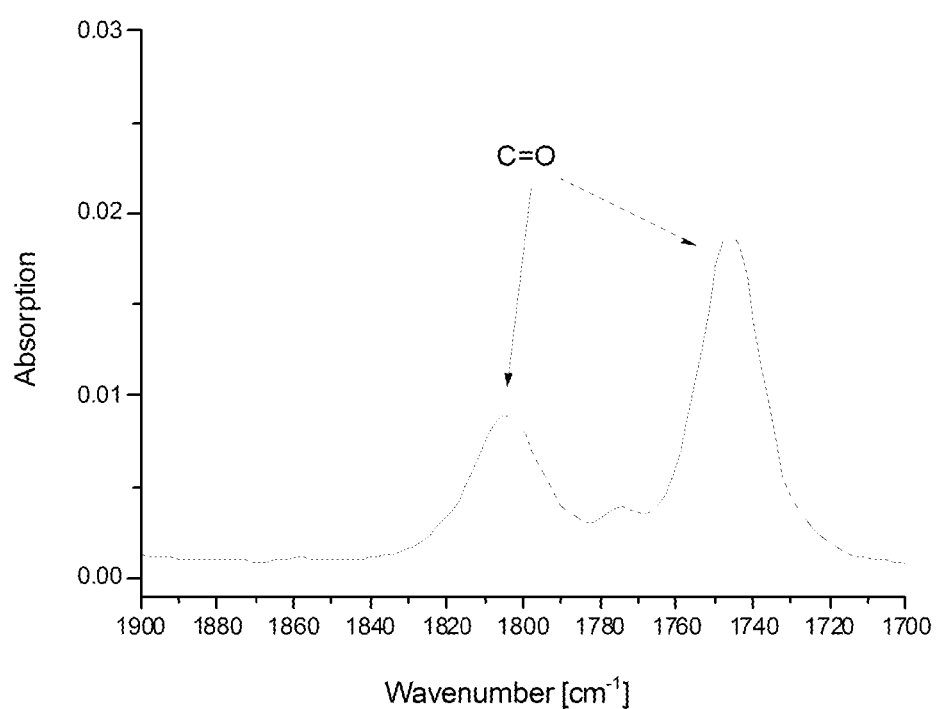

PROCESS FOR PREPARING BRANCHED POLYETHERCARBONATES AND USE THEREOF

The present application claims priority from PCT/EP2012/062959 filed on Jul. 4, 2012, which claims priority from German Patent Application No. DE 10 2011 109 614.4 filed on Aug. 3, 2011, the disclosures of which are incorporated herein by reference in their entirety.

FIELD OF THE INVENTION

The present invention relates to a process for preparing branched polyethers and/or polyether-like structures, to these branched polyethers themselves, and to their use.

It is noted that citation or identification of any document in this application is not an admission that such document is available as prior art to the present invention.

Branched polyether structures are known in principle from the scientific literature and are prepared essentially by means of two process principles.

First of all it is customary to carry out the alkoxylation in the presence of polyhydroxy-functional starters, and so per se no linear polyether structures can be constructed.

A disadvantage in the first process principle is posed by the aggregate state of the starter. At functionalities of 3 or more hydroxyl groups, the starters are almost exclusively solid in nature, and melt only at very high temperatures and hence are made available for the reaction with alkylene oxides in an appropriate solvent. Examples that may be mentioned here are the following specifications—U.S. Pat. Nos. 4,585,858 and 5,273,772—which describe the alkoxylation of sucrose, methylglucoside or starch and also polysaccharides in aromatic solvents such as toluene or xylene. If, as in the case described, this solvent is inert with respect to the reaction conditions, it must be removed following the reaction, necessitating an additional process step, of distillation. This distillation step prolongs the operating time and, furthermore, requires precautions to be taken on an industrial scale that entail significant financial investment. Furthermore, from environmental and economic standpoints, the use of solvents can be criticized. As alternatives, there are also processes described in which the solvent is not inert but instead takes part in the reaction. Examples of this include the alkoxylation of cellulose with polypropylene glycol as solvent, in U.S. Pat. No. 3,336,291, and the propoxylation of sucrose and sorbitol in glycerol, in DE 10 2007 052599. In both cases the solvent likewise undergoes alkoxylation on its hydroxyl groups. This leads necessarily to an inhomogeneous product composition, and, depending on the specific application of the resulting product, this may have adverse effects on the application properties.

It is also customary, furthermore, to use mono- or dihydroxy-functional starters, which are also reacted with branching agents before, during or after the reaction with alkylene oxides. A branching agent is a molecule which, following reactive incorporation into the polyether framework, provides two reactive groups at which further chain construction can take place.

Two of the most widespread branching agents are glycidol and hydroxyl-functional oxetanes. The construction of allyl-terminated polyethers through the use of glycidol is described in patent applications WO 2007/075927 (US2010234518) and WO 2010/003610 (US 2011185947) or WO 2010/003611 (US2011294933), and through the incorporation of oxetanes in DE 10 2006 031152 (US 2010240842) and likewise WO 2007/075927.

DE 10 2007 043618 (US 2008085980) describes a base-catalysed addition reaction of glycidol with allyl alcohol or glycerol monoallyl ether. The starting compound is deprotonated through the addition of NaOH or sodium methoxide as catalyst, and the resulting water or methanol by-products are removed under reduced pressure. Moreover, the glycidol addition reaction is carried out at temperatures less than 100° C. in order to prevent unwanted side reactions.

Saturated polyether structures based on glycidol are likewise known. EP 0 116 978 (US 07/356,359) describes the Lewis acid and alkali metal hydroxide catalysed polymerization of glycidol and ethylene oxide onto polyhydroxy-functional polyethers, and JP 60 094126 the reaction of fatty alcohols with ethylene oxide and glycidol.

A further possibility for the construction of branched polyether structures is provided by the use of protected starters or comonomers. Processes of these kinds are of only minor significance on account of the complex multistage reaction sequence required, which also entails high capital costs in terms of process engineering.

The use of protected starters is described in, for example, EP 0 043 966 or EP 0 141 253 (U.S. Pat. No. 4,581,470), where the alkoxylation of ketal-protected alcohols such as solketal is carried out, followed by optional capping on the terminal OH group, after which, by means of ketal cleavage, two new OH groups can be generated, which are amenable to further alkoxylation.

The copolymerization of protected comonomers, such as tert-butyl glycidyl ether, for example, together with alkylene oxides leads in the first instance to linear polyethers. Following an acidically catalysed elimination of the tert-butyl groups, these polyethers can be converted to linear, polyhydroxy-functional polyethers (U.S. Pat. No. 4,003,961, U.S. Pat. No. 4,014,854), which can subsequently be made available for further alkoxylations (GB 1 267 259, GB 1 516 195).

The patent applications WO 2010/003610 and WO 2010/003611 are the first to cite, alongside glycidol, the use of glycerol carbonate as a possible branching component. With regard to the polymerization of glycerol carbonate, reference is made to the scientific publication by G. Rokicki et al., Green Chemistry, 2005, 7, 529-539, which describes the homopolymerization of glycerol carbonate onto polyhydroxy-functional starters. Said process is also described in depth in PL 199346.

The advantages entailed by the use of glycerol carbonate in place of glycidol are only briefly outlined in said publications, and will be elucidated in detail below.

The advantages of the branching agent glycerol carbonate become clear especially when account is taken of safety-relevant and ecotoxicological aspects. Glycidol is prone to spontaneous polymerizations, which usually take place with decomposition and explosion, and therefore harbours an increased hazard potential particularly as regards storage and reaction on the industrial scale. These requirements must be met by comprehensive measures relating to technical plant, and hence also by financial investment.

The industrial production of glycidol, moreover, is based on methods that are detrimental to environment and resources. Glycidol, for example, is obtained by dehydrochlorination of 3-chloropropane-1,2-diol, based on epichlorohydrin as a starting component. Preparations thereof require large quantities of toxic halogens such as chlorine, and the final dehydrochlorination produces large quantities of unusable by-products. Hence exclusively petrochemical raw materials are irrevocably consumed, and large quantities of unusable by-products are generated; both of these factors contribute to a disproportionate burden on our ecosystem.

Furthermore, glycidol also harbours a high health-relevant hazard potential, since it is carcinogenic and, moreover, may lead to severe eye damage in the event of eye contact.

Glycerol carbonate, in contrast, is the significantly more advantageous compound from the standpoint of ecotoxicology. It is obtained industrially from the cheap, renewable raw material glycerol. Glycerol is increasingly being obtained as a by-product in the recovery of biodiesel from fatty acid esters. The glycerol carbonate can be obtained ultimately by transesterification with dimethyl carbonate or condensation with urea. Glycerol carbonate is a stable, colourless compound which is toxicologically benign and not subject to labelling requirements. Moreover, unlike glycidol, glycerol carbonate can be distilled without decomposition, thereby considerably facilitating any required purification.

The process described in WO 2010/003610 and WO 2010/003611 or G. Rokicki et al. for preparing hyperbranched polyethers describes a very slow and therefore time-consuming reaction of glycerol carbonate onto polyols, and this reaction, moreover, is carried out in solvent and hence leads to operations that are not economic on the plant scale. The products are all free from carbonate groups.

The processes described in the aforementioned patent applications describe the step, as already discussed above, of the distillative separation of the cleavage component resulting from the reaction of hydroxyl-functional starter compound with the catalyst, and this is a disadvantage in process engineering terms.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of any previously described product, method of making the product, or process of using the product.

SUMMARY OF THE INVENTION

The object of the present invention was to provide an alternative process for preparing branched polyethers and/or polyether-like structures.

Surprisingly it has been found that branched polyethers and/or polyether-like structures can be obtained in a simple way through reaction of glycerol carbonate with starter and epoxide.

The present invention therefore provides a process for preparing branched polyethers and/or polyether-like structures, which is characterized in that it has the following steps:

(a) reaction of a starter of the general formula (II)

$$Z(X-H)_j \qquad (II)$$

where
   X=independently at each occurrence O, NH, N-alkyl, N-aryl or S, preferably O,
   j=1 to 10, preferably 1 to 5, more preferably 1, 2 or 3, and
   Z=any organic radical, with each X being linked to a carbon atom of the organic radical,
   with one or more reactants suitable for ring-opening polymerization, preferably epoxide(s),
(b) reaction of the reaction mixture obtained in step (a) with glycerol carbonate,
(c) reaction of the reaction mixture obtained in step (b) with one or more reactants suitable for ring-opening polymerization, preferably epoxide(s).

Likewise provided by the present invention are compounds of the formula (I)

$$Z(-X-M1_{i1}-M2_{i2}-M3_{i3}-M4_{i4}-M5_{i5}-M6_{i6}-M7_{i7}-M8_{i8}-M9_{i9}-M10_{i10}-M11_{i11}-J_{i12})_i(-X-J)_k \qquad (I)$$

as defined further hereinafter, and also compositions comprising these compounds.

Additionally provided by the present invention is the use of a compound or of a composition according to at least one of claims 6 to 13 as surface-active substance, as additive for ceramic formulations, as additive in coating materials, polymeric moulding compounds or thermoplastics, as food additive, as crosslinker, as thickener, as additive for polyurethane compounds, in the production of paints, inks or adhesives, as support of catalysts, or in biomedicine generally, or as adjuvant for cosmetic formulations and cleaning compositions.

The process of the invention has the advantage that compounds are obtained in which the carbonate structures are at least partly retained. Through the carbonate functions and/or the branches it is possible to obtain polyethercarbonates which in spite of the incorporation of relatively large amounts of ethylene oxide are liquid under standard conditions.

The use of glycerol carbonate as reactant also has the advantage that in comparison to glycidol it is not toxic and it is not prone to autopolymerization.

A further advantage of the present invention is that there is no need to remove the alcohols produced when preparing the polyethercarbonates, without any need to accept quality detractions of the end product.

An advantage of the products of the invention, moreover, is that the polyethercarbonates containing carbonate groups are stable. No differences at all were in evidence in the IR spectra before and after three-week storage at 60° C.

The subject matter of the invention is described hereinafter by way of example, without any intention that the invention should be confined to these exemplary embodiments. Where, in the text below, ranges, general formulae or classes of compound are indicated, the intention is that they should include not only the corresponding ranges or groups of compounds explicitly mentioned, but also all sub-ranges and sub-groups of compounds which may be obtained by extraction of individual values (ranges) or compounds. Where documents are cited in the present description, the intention is that their content, particularly in relation to the subject matter in whose context the document has been cited, should belong in full to the disclosure content of the present invention. Where the present invention uses chemical (empirical) formulae, the indicated indices may represent not only absolute numbers but also average values. In the case of polymeric compounds, the indices preferably represent average values. In the case of percentages, the figures in question, unless otherwise indicated, are in percent by weight. Where, in the text below, measurement values are reported, these are measurements carried out, unless otherwise indicated, under standard conditions (25° C. and 1013 mbar). Where average values are reported in the text below, they are, unless otherwise indicated, weight averages.

Where polyethercarbonates, branched polyethers and/or polyether-like structures are referred to below, the reference, unless otherwise indicated, is to compounds of the formula (I) according to the invention. Such compounds of the formula (I) encompass, for example, polyethers, polyetherols, polyether alcohols and polyether esters. The expression "poly" in this context does not necessarily mean that there are a multiplicity of ether functionalities or alcohol functionalities in the molecule or polymer. Instead it is merely an indication that there are at least repeating units of individual units or else compositions present that have a relatively high molar mass and also, moreover, a certain polydispersity. In connection with this invention, the word-fragment "poly" encompasses not only, exclusively, compounds having at least three repeating units of one or more monomers in the molecule, but also, preferably, those compositions of compounds which exhibit a molecular weight distribution and possess preferably a weight-average molecular weight of at least 200 g/mol. This definition takes account of the fact that within the field of art under consideration it is customary to term such compounds as polymers even when they do not appear to satisfy the definition of a polymer by analogy with OECD or REACH guidelines.

BRIEF DESCRIPTION OF THE DRAWINGS

FIG. 1 shows the IR spectrum of the branched polyethercarbonate prepared according to Example 1. The bands at wavenumbers of approximately 1745 and 1805 are assignable to the CO units (M9).

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The process of the invention for preparing branched polyethers and/or polyether-like structures, is notable for the fact that it has the following steps:

(a) reaction of a starter of the general formula (II)

$$Z(X\text{---}H)_j \qquad (II)$$

where
X=independently at each occurrence O, NH, N-alkyl, N-aryl or S, preferably O,
j=1 to 10, preferably 1 to 5, more preferably 1, 2 or 3, and
Z=any organic radical, with each X being linked to a carbon atom of the organic radical,
with one or more reactants suitable for ring-opening polymerization, preferably epoxide(s),
(b) reaction of the reaction mixture obtained in step (a) with glycerol carbonate,
(c) reaction of the reaction mixture obtained in step (b) with one or more reactants suitable for ring-opening polymerization, preferably epoxide(s).

Preferably Z is any organic radical, which may be saturated, unsaturated or aromatic, linear, cyclic or branched and which may also contain heteroatoms, and also further substituted, functional, organic, saturated or unsaturated radicals. The radical Z has preferably 1 to 1500, more preferably 2 to 500, more particularly 3 to 30 carbon atoms.

The branched polyethers obtained with the process of the invention preferably have at least one structural unit —O—C(O)—O—.

The reaction in steps (a) and (c) of the process of the invention is preferably an alkoxylation.

Steps (a) to (c) may be carried out in the presence or in the absence of a solvent. Steps (a) to (c) are preferably carried out solventlessly.

Steps (a) to (c) of the process of the invention are preferably carried out as a one-pot process. In this case it may be preferable not to remove the alcohol formed in step (a) when an alkali metal alkoxide is used, without any need to accept quality detractions of the end product.

The process can of course also be interrupted after each of the three operational steps. The product obtained as an intermediate in each case can be discharged and stored until further reaction, or else may be reacted further in the same reaction vessel or in another suitable such vessel. The operational steps need not to be carried out immediately after one another, although a too long storage time of the intermediate may adversely affect the quality of the end product.

Where the starter compound used is already a polyether, polyester or polyetherester, it may be possible to forego the first process step (a), or it may be that the first process step has already taken place.

It is possible to combine process steps (a) and (b) or (b) and (c). This, however, is less preferable, owing to any build-up in pressure as a result of possible $CO_2$ liberation during the glycerol carbonate reaction.

After a first step (c) it is possible again to carry out a step (b), and then again a step (c), and so on. Reactants suitable for ring-opening polymerization that are used in steps (a) and (c) may be used as pure substances or in any desired mixtures in the individual process steps. The sequence of the steps of addition reaction of the various reactants is arbitrary, and so may result in statistical constructions of the polyether framework, known to the skilled person as random structure, or in gradient-like or block-like constructions.

The reactants suitable for ring-opening polymerization that are used in steps (a) and (c) may be identical or different.

Reactants used that are suitable for ring-opening polymerization may be, for example, alkylene oxides, glycidyl ethers, lactones or cyclic acid anhydrides. For the purposes of the present invention, glycerol carbonate is not intended to be a member of the group of reactants suitable for ring-opening polymerization in steps a and c.

Alkylene oxides that can be used are in general all alkylene oxides known to the skilled person, in pure form or in any desired mixtures, that lead to the units M1, M2 or M3 defined in formula (I). It is possible with preference to use ethylene oxide, propylene oxide, 1,2-butylene oxide, 2,3-butylene oxide, isobutylene oxide, octene 1-oxide, decene 1-oxide, dodecene 1-oxide, tetradecene 1-oxide, hexadecene 1-oxide, octadecene 1-oxide, C20/28 epoxide (commercial mixture of eicosanol and octasanol), -pinene epoxide, cyclohexene oxide, 3-perfluoroalkyl-1,2-epoxypropane and styrene oxide. Particular preference is given to using ethylene oxide, propylene oxide, dodecene 1-oxide and styrene oxide. Especially preferred is use of ethylene oxide and/or propylene oxide, leading, after reaction has taken place, to the units M1 and/or M2, respectively, defined in formula (I).

As glycidyl ethers, which after reaction has taken place lead to the monomer units M4 in formula (I), it is possible to employ alkyl-, aryl-, alkaryl- or alkoxy-substituted glycidyl ethers. The expression "alkyl" stands here preferably for linear or branched alkyl or alkenyl radicals having 1 to 30, preferably 1 to 12 and more preferably 2 to 8 carbon atoms. More preferably, the expression "alkyl" stands for a methyl, ethyl, propyl, butyl, tert-butyl, 2-ethylhexyl, allyl or a C12-C14 radical. The expression "aryl" stands preferably for a phenyl radical (phenyl glycidyl ether), and the expression "alkaryl" stands preferably for an o-cresyl, p-tert-butylphenyl or benzyl radical (o-cresyl glycidyl ether, p-tert-butylphenyl glycidyl ether or benzyl glycidyl ether). The expression "alkoxy" stands preferably for methoxy, ethoxy, propoxy, butoxy and/or phenylethoxy, and embraces from 1 to 30 alkoxy units, which may also be a combination of two or more different alkoxy units. As glycidyl ethers it is also possible to use polyfunctional glycidyl ethers such as 1,4-butanediol diglycidyl ether, 1,6-hexanediol diglycidyl ether, cyclohexanedimethanol diglycidyl ether, neopentyl glycol diglycidyl ether, polyethylene glycol diglycidyl ether, polypropylene glycol diglycidyl ether, polyglycerol 3-glycidyl ether, glycerol triglycidyl ether, trimethylolpropane triglycidyl ether or pentaerythritol tetraglycidyl ether. The use of tri- or tetrafunctional monomers of these kinds also leads to the construction of branched structural elements.

In order to construct branched polyethercarbonates with the units M10 and M11 it is possible for polyetherester copolymers of alkylene oxides and lactones and/or acid anhydrides to be incorporated into the polyethercarbonate framework. Copolymers of these kinds are known from the prior art. Copolymers of alkylene oxides and lactones are described in the following specifications, for example U.S. Pat. Nos. 2,962,524, 3,312,753, 3,689,531, 4,291,155, 5,525,702, 3,689,531, 3,795,701, 2,962,524 and EP 2 093 244. Copolymers of alkylene oxides and cyclic anhydrides are described for example in the following specifications: DE 69532462, U.S. Pat. Nos. 4,171,423, 3,374,208, 3,257,477, EP 2 093 244. All the aforesaid specifications and the specifications cited in them as prior art are hereby introduced by way of reference and are considered part of the disclosure content of the present invention.

The polyetherester copolymers discussed can be prepared by the methods described in the abovementioned patents and used as starters for the synthesis of branched polyethercarbonates. Also possible in principle, however, is the preparation first of all, from any desired starter alcohol with alkylene oxides and glycerol carbonate, of a branched polyethercarbonate, which is then reacted subsequently, in accordance with the reactions described in the patent literature cited above, to form polyetherester copolymers.

Where lactones are used as reactants suitable for ring-opening polymerization, those used are preferably of the formula (III).

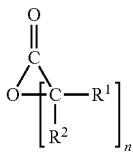

(III)

where $R^1$ and $R^2$ independently of one another may be hydrogen or alkyl, alkoxy, aryl or aralkyl groups, and also n=3 to 8, which are copolymerized with ring-opening polymerization to give polyetherester carbonates.

Suitable lactones are preferably selected from the group encompassing γ-butyrolactone, δ-valerolactone, ε-caprolactone, ζ-enantholactone, η-caprylolactone, methyl-ε-caprolactone, dimethyl-ε-caprolactone, trimethyl-ε-caprolactone, ethyl-ε-caprolactone, isopropyl-ε-caprolactone, n-butyl-ε-caprolactone, dodecyl-ε-caprolactone, methyl-ζ-enantholactone, methoxy-ε-caprolactone, dimethoxy-ε-caprolactone and ethoxy-ε-caprolactone. Preference is given to using ε-caprolactone, methyl-ε-caprolactone and trimethyl-ε-caprolactone, more preferably ε-caprolactone.

Where cyclic anhydrides are used as reactants for ring-opening polymerization, those of the formula (IV) are used with preference.

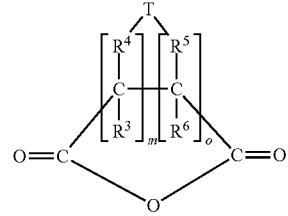

(IV)

where $R^3$, $R^4$, $R^5$ and $R^6$ independently of one another may be hydrogen and/or an organic radical, preferably H or alkyl, alkenyl, alkylidene, alkoxy, aryl and/or aralkyl groups, m and o may independently of one another be 1 to 8, with m and o preferably being 1; optionally, $R^3$ and/or $R^6$ may also not be present; optionally, the radicals $R^3$ and $R^6$ may also form a bond (if m=o=1), to form a double bond; additionally, the hydrocarbon radicals $R^4$ and $R^5$ may be bridged cycloaliphatically or aromatically via the fragment T, and m and o are preferably 1, and T may represent a divalent alkylene radical or alkenylene radical, which may be substituted further; the units with the indices m and o may be arranged arbitrarily, and it is also possible, optionally, for a radical $R^3$, $R^4$, $R^5$ or $R^6$ not to be present—for example, if one of the organic radicals is an alkylidene radical, the respective geminal radical is not present—for instance, if $R^3$ is methylidene (=CH$_2$), then $R^4$ is not present. Examples of preferred cyclic anhydrides are succinic anhydride, maleic anhydride, itaconic anhydride, glutaric anhydride, adipic anhydride, citraconic anhydride, phthalic anhydride, hexahydrophthalic anhydride and trimellitic anhydride, and also polyfunctional acid anhydrides such as pyromellitic dianhydride, benzophenone-3,3',4,4'-tetracarboxylic dianhydride, 1,2,3,4-butanetetracarboxylic dianhydride or radically polymerized homo- or copolymers of maleic anhydride with ethylene, isobutylene, acrylonitrile, vinyl acetate or styrene. Particularly preferred anhydrides are succinic anhydride, maleic anhydride, itaconic anhydride, glutaric anhydride, adipic anhydride, citraconic anhydride, phthalic anhydride and hexahydrophthalic anhydride.

When lactones and/or cyclic acid anhydrides are used, as well, they may be used in each case alone or in any desired combinations.

Step (a):

As starters it is possible in principle to use all compounds which correspond to the general formula (II). More particularly it is possible to use mono-, di- or polyamines, mono-, di- or polythiols and/or mono-, di- or polyalcohols as starters of the formula (II).

The compounds of the formula (II) used as starters are preferably those in which X=O. Preference is given to using compounds of the formula (II) having molar masses of 32 to 30 000 g/mol, more particularly 50 to 2000 g/mol, and with j=1 to 8, preferably with j=1 to 5 hydroxyl groups. Especially when X=O, preferred starters of the formula (II) are those in which preferably j=1.

It can be advantageous if the starter (II) used in step (a) is an alkyl, aryl or aralkyl compound with j=1 to 3. Particularly preferred for use as starters (II) are alkyl, aryl or aralkyl compounds in which j=1 to 3 and which are optionally α-hydroxy-functional and ω-unsaturated.

Examples of preferred compounds of the formula (II) with X=O and j=1 include allyl alcohol, 2-allyloxyethanol, vinyl alcohol, 5-hexen-1-ol and 10-undecen-1-ol, ethanol, propanol, isopropanol, butanol, and also all isomeric pentanols. Use may also be made of the corresponding methallyl compounds, such as methallyl alcohol or methallyl polyalkylene oxides, for example. Where allylic starter compounds are referred to in the context of this invention, this term also embraces the methallylic analogues, without any need for this to be separately addressed. Where the term "(meth)allylic" is used, it likewise embraces both "allylic" and "methallylic".

Additionally it is also possible in particular to use starters of sustainable origin, more particularly pure fatty alcohols. By fatty alcohols are meant primary aliphatic alcohols of formula (II) in which Z is an aliphatic, linear or branched hydrocarbon radical having 6 to 22 carbon atoms and 0 and/or 1, 2 or 3 double bonds. Typical examples are caproyl alcohol, enanthyl alcohol, caprylyl alcohol, pelargonyl alcohol, capryl alcohol, 1-undecanol, lauryl alcohol, 1-tridecanol, isotridecyl alcohol, myristyl alcohol, 1-pentadecanol, cetyl alcohol, palmoleyl alcohol, 1-heptadecanol, stearyl alcohol, isostearyl alcohol, oleyl alcohol, elaidyl alcohol, petroselinyl alcohol, linolyl alcohol, linolenyl alcohol, 1-nonadecanol, elaeostearyl alcohol, arachidyl alcohol, 1-heneicosanol, gadoleyl alcohol, behenyl alcohol, erucyl alcohol and brassidyl alcohol, and also technical mixtures thereof that are obtained, for example, during the high-pressure hydrogenation of technical methyl esters based on fats and oils or aldehydes from the Roelen oxo process, and also as a monomer fraction during the dimerization of unsaturated fatty alcohols. Besides the class of compound of the oxo-process alcohols, which usually carry 2 to 4 methyl groups as branches, it is also possible as starter compounds to use the alcohols known as Guerbet alcohols, which are branched with an alkyl group in position 2. Suitable Guerbet alcohols include 2-ethylhexanol, 2-butyloctanol, 2-hexyldecanol and/or 2-octyldodecanol. It is also possible, moreover, to use industrially prepared, primary aliphatic alcohols of the general formula (II) in which Z is an aliphatic, linear or branched hydrocarbon radical having more than 22 carbon atoms. Mention may be made here, by way of example, of the product class of the UNILIN® alcohols, which represent long-chain, saturated, primary alcohols which may have an average chain length of up to 50 carbon atoms. Cyclic starter compounds conforming to the formula (II) may also be used as starters. As exemplary, non-limiting representatives of such compounds, it is possible to name cyclopentanol, 1-methylcyclopentanol, cyclohexanol, 2-cyclohexen-1-ol, cycloheptanol, 1-methyl-4-isopropenyl-6-cyclohexen-2-ol, furfuryl alcohol, solketal, 2-cyclohexen-1-ol, 1-methyl-4-isopropenyl-6-cyclohexen-2-ol and 5-norbornene-2-methanol and 5-norbornene-2-methanol. Any hydroxy-functional, aromatic starter compounds as well, such as benzyl alcohol and phenol derivatives, catechols or resorcinols, can be used as starters.

As suitable starter compounds of the formula (II) it is also possible to use diol or polyol compounds which carry two (j=2), three (j=3) or more than three (j=4, 5, etc.) hydroxyl groups. An increasing degree of functionality is generally accompanied by an increased polydispersity, which, however, may well also advantageously influence the physical properties of the end products.

As diols (j=2) it is possible with preference to use ethylene glycol, propylene glycol, di-, tri- and polyethylene glycol, 1,2-propylene glycol, di-, tri- and polypropylene glycol, neopentyl glycol, 1,4-butanediol and 1,6-hexanediol.

Compounds with j>3 are preferably commercial sugar alcohols such as erythritol, xylitol and more particularly the hexavalent reduction products of monosaccharides such as mannitol and sorbitol. Compounds such as trimethylolpropane, di(trimethylol)ethane, di(trimethylol)propane, trimethylolpropane monoallyl ether, pentaerythritol, di(pentaerythritol), glycerol, di(glycerol), or glycerol monoallyl ether, polyglycerol or else other compounds which are based on natural substances and carry hydroxyl groups, such as cellulose sugars or lignin, for example, may also be used, however.

Depending on the requirements with regard to the end product, the starter used may be a highly purified grade or may be the standard commercial product of technical purity.

As reactants suitable for ring-opening polymerization it is possible to use one or more of the abovementioned reactants simultaneously or in succession.

In step (a) of the process of the invention the reaction takes place preferably such that first of all the starter of the formula (II) is at least partly deprotonated using alkali metal hydroxide or alkoxide, preferably sodium methoxide, potassium methoxide or potassium hydroxide, more preferably sodium methoxide or potassium hydroxide. The amount of alkali metal hydroxides or alkoxides used is preferably from 5 to 25 mol %, more preferably from 10 to 20 mol %, based on the number of the (XH) groups in the starters used.

The resulting mixture, comprising preferably alcohols and alkoxides, depending on the starter used, is reacted with reactants suitable for ring-opening polymerization, preferably alkylene oxides, preferably at a temperature between 80° C. and 200° C., more preferably from 90° C. to 170° C. and very preferably from 100 to 125° C. The reaction takes place preferably at pressures in the range from 0.001 to 100 bar, more preferably in the range from 0.005 to 10 bar and very preferably from 0.01 to 5 bar (absolute pressures in each case).

Where lactones or cyclic anhydrides are used as reactants suitable for ring-opening polymerization, it may be advantageous to carry out process step (a) as described in specifications U.S. Pat. Nos. 2,962,524, 3,312,753, 3,689,531, 4,291,155, 5,525,702, 3,689,531, 3,795,701, 2,962,524, EP 2 093 244 or DE 69532462, U.S. Pat. Nos. 4,171,423, 3,374,208, 3,257,477, EP 2 093 244.

The reaction of the reactants suitable for ring-opening polymerization, preferably of the alkylene oxide, in process step (a) may optionally be followed by a deodorization step in order to remove traces of unreacted reactants suitable for ring-opening polymerization, preferably alkylene oxides. In the case of a deodorization step of this kind, the reactor, preferably at the temperature of process step (a), is evacuated preferably down to a vacuum of less than or equal to 100 mbar, more preferably down to a vacuum of less than or equal to 60 mbar and very preferably down to a vacuum of less than or equal to 30 mbar.

Step (b):

In step (b), the reaction mixture obtained in step (a) is reacted with glycerol carbonate. The glycerol carbonate introduces the units M5 to M9 into the compounds of the formula (I).

In order to obtain the branched structures of the formula (I), use is made preferably of at least 1 mol, preferably at least 2 mol, of glycerol carbonate per mole of (XH) groups, preferably (OH) groups, of the starter of the formula (II). To limit the degree of branching it has proved to be advantageous to place an upper limit on the glycerol carbonate content. An ideal parameter here has proved to be the percentage molar glycerol carbonate content, relative to the molar content of the sum total of all the reactants (monomers) from which the polyethercarbonate framework is constructed, disregarding the mole of starter alcohol. This molar content ought preferably to be not more than 80 mol %, more preferably not more than 50 mol % and very preferably not more than 35 mol %.

The reaction in step (b) takes the preferred form of an anionic ring-opening polymerization. This is the way in which the production of well-defined structures is easiest to ensure.

For the reaction in step (b) the reactor (if no deodorization step has been carried out after process step (a)) is evacuated down to a vacuum of less than or equal to 100 mbar, more preferably down to a vacuum of less than or equal to 60 mbar, and more preferably down to a vacuum of less than or equal to 30 mbar. To the reaction mixture in the evacuated reactor the glycerol carbonate, preferably at a temperature of 120° C. to 220° C., more preferably between 140° C. and 200° C. and very preferably at a temperature between 160° C. and 180° C., is supplied to the reaction mixture.

Through the rate of addition of the glycerol carbonate and through the selected reaction temperature it is possible to regulate the ratio of glycerol carbonate-based branching units M5-M8 to carbonate ester segments M9. The faster the rate of addition of the glycerol carbonate and/or the lower the temperature, the higher the amount of M9 units. The glycerol carbonate is added preferably at a rate of 0.1 to 10 mol/h, more preferably 0.5 to 5 mol/h and very preferably 1 to 2.5 mol/h, in each case per mole of (XH) in the starters used.

The reaction of the glycerol carbonate may be manifested in some cases in the liberation of $CO_2$ and, accordingly, in a build-up of pressure within the reactor. This pressure build-up can be counteracted by continuous or periodic letdown, in which case, preferably, the pressure is lowered to atmospheric pressure. The rate of addition of the glycerol carbonate, when using allyl compounds, is preferably selected such that the pressure in the reactor at no time exceeds a level of 2 bar overpressure (baro). Higher pressures in the reactor ought to be avoided since, at high temperatures and pressures, the rearrangement of allyl groups into propenyl groups, which can no longer be hydrosilylated, takes place to an increased extent, and this would represent an intolerable quality deficiency.

It can be advantageous if step (b) is carried out such that the reaction proper is followed by an after-reaction, during which the reaction mixture is maintained under the same conditions of temperature and pressure conditions as during the reaction (addition of glycerol carbonate) for a period of 1 min to 20 h, preferably 0.1 h to 10 h and more preferably of 1 h to 5 h, counting from the last addition of glycerol carbonate, without further addition of glycerol carbonate.

Step (c):

In step (c) of the process there is a reaction of the reaction mixture obtained in process step (b) with reactants suitable for ring-opening polymerization. These reactants may be the same as or different to the reactants used in process step (a). The reaction takes place preferably under the pressure and temperature conditions specified for process step (a).

In all three process steps, the (living) anionic ring-opening polymerization is controlled by the rapid exchange of the protons between the (XH) and X— groups, preferably the alcohol and alkoxide groups, in the growing chains. Since each mole of glycerol carbonate incorporated by reaction generates an additional hydroxyl group, the process involves a drop in the effective concentration of X— ions. A consequence of this is that the reaction rate in process step (a) may be slower than in process step (c). To take account of this effect, it may be of advantage to carry out further addition of alkali metal hydroxide or alkali metal alkoxylate (as catalyst) after the second step, step (b), in the process. To obtain a faster conversion of the glycerol carbonate, it is of course also possible, after process step (a) and before or during process step (b), for a renewed dosing of catalyst to be carried out, though this is less preferred.

The low molecular mass alcohol (or water) formed from the reaction of the catalyst (alkali metal hydroxide or alkali metal alkoxylate) with the starter of the formula (II) for deprotonation may be removed by vacuum distillation both during process step (a) and during process steps (b) and (c). It is particularly preferred, however, for alcohol resulting from the catalysis not to be distilled off at any time, since that step would entail additional plant expenditure and hence financial investment as well. Since, moreover, the quality of the end product is not adversely affected in any way by the presence of this or these secondary component(s), it is preferred that any such process step be omitted.

After process step (c), or after the last process step (c) if two or more process steps (c) are carried out, there may be a subsequent neutralizing step, in which the alkali is neutralized by addition, for example, of appropriate amounts of inorganic acids, such as phosphoric acid, or of organic acids, such as lactic acid, for example. Treatment with an acidic ion exchanger as neutralizing step is likewise possible though less preferred.

The terminal hydroxyl groups of the branched polyethercarbonates prepared may remain free or may be partly or completely modified in order to be able to bring about optimum compatibility in the application matrix. Conceivable forms of modification include esterifications or etherifications as well as further condensation or addition reactions, with isocyanates, for example. Monoisocyanates used may be compounds such as n-butyl isocyanate, cyclohexyl isocyanate, tolyl isocyanate, stearyl isocyanate or monoadducts of IPDI or MDI, preferably n-butyl isocyanate, tolyl isocyanate, and very preferably n-butyl isocyanate. Although less preferred, it is also possible to use difunctional isocyanates such as MDI, IPDI or TDI. All other known possibilities for modification of hydroxyl groups may also be employed. The terminal hydroxyl groups preferably remain free, are acetylated, methylated, or endcapped with carbonates. The aforementioned chemical reactions need not necessarily take place quantitatively. Accordingly, the free hydroxyl groups may also undergo only partial chemical modification.

One particular embodiment of the synthesis of a branched polyethercarbonate in accordance with the process claimed in the present specification, in which the allyl alcohol starter has first 4 mol of ethylene oxide, then 3 mol of glycerol carbonate and finally 4 mol each of ethylene oxide and propylene oxide added onto it randomly, may lead, for example, to a special compound of the formula (I) according to the invention, which is shown in formula (V). From the structure of the formula (V) it is apparent that only a third of the theoretically possible quantity of units M9 provided by the glycerol carbonate has been incorporated. The other two thirds of the theoretically possible M9 units have escaped as $CO_2$ during the reaction.

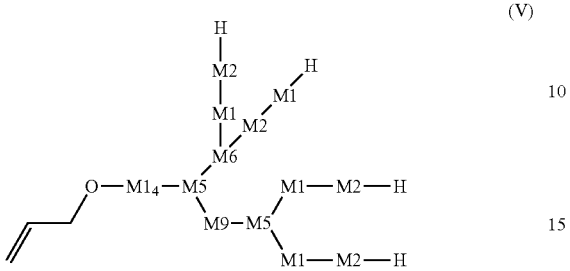
(V)

With the process of the invention it is possible to obtain the compounds of the formula (I) of the invention and/or compositions which comprise the compounds of the formula (I) according to the invention. As further components, these compositions may have, in particular, alkali metal ions, which may come from the catalyst used, and may also have potassium salts and/or sodium salts of an organic or inorganic acid, more particularly phosphoric acid or lactic acid, which may come from any neutralizing step carried out.

The compounds of the invention are notable in that they satisfy the formula (I)

$$Z(-X-M1_{i1}-M2_{i2}-M3_{i3}-M4_{i4}-M5_{i5}-M6_{i6}-M7_{i7}-M8_{i8}-M9_{i9}-M10_{i10}-M11_{i11}-J_{i12})_i(-X-J)_k \quad (I)$$

where
- i=1 to 10, preferably 1 to 5, more preferably 2 to 3,
- k=0 to 9, preferably 0 to 5, more preferably 1 to 3,
- i+k=1 to 10, preferably 1 to 5, more preferably from 2 to 3,
- i1 to i12=each independently of one another 0 to 500, preferably 0.1 to 100 and very preferably 1 to 30,
- X=identically or differently O, NH, N-alkyl, N-aryl or S,
- Z=any desired organic radical as defined for formula (II), with each X being linked to a carbon atom of the organic radical,
- J=independently at each occurrence hydrogen, a linear, cyclic or branched, aliphatic or aromatic, saturated or unsaturated hydrocarbon radical having 1 up to 30 C atoms, a carboxylic acid radical having 1 to 30 carbon atoms, or a functional, organic, saturated or unsaturated radical substituted by heteroatoms, preferably a hydrogen atom or a methyl or acetyl radical,

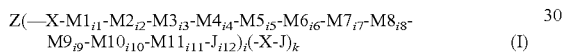

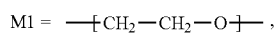

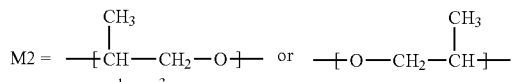

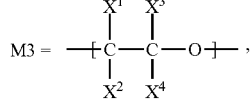

where $X^1$ to $X^4$ independently of one another are hydrogen or linear, cyclic or branched, aliphatic or aromatic, saturated or unsaturated hydrocarbon radicals having 1 up to 50 C atoms, preferably 2 to 50 C atoms, and may optionally contain halogen atoms, with the proviso that $X^1$ to $X^4$ are not selected such that M3 is the same as M1 or M2,

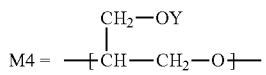

where Y independently at each occurrence is a linear, cyclic or branched, aliphatic or aromatic, saturated or unsaturated hydrocarbon radical having 2 up to 30 C atoms, and may also contain heteroatoms,

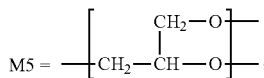

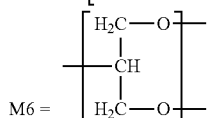

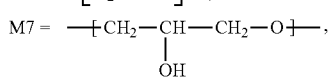

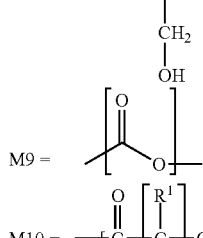

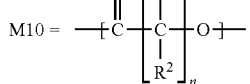

where $R^1$ and $R^2$ independently of one another are either hydrogen or alkyl, alkoxy, aryl or aralkyl groups, preferably having 1 to 15 carbon atoms, and
n independently at each occurrence is 3 to 8, and not only n but also R' and $R^2$ in each unit M10 may be identical or different,

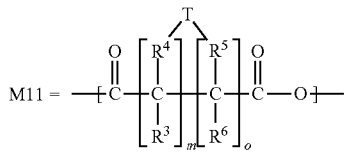

where $R^3$, $R^4$, $R^5$ and $R^6$ independently of one another alternatively are hydrogen or alkyl, alkenyl, alkylidene, alkoxy, aryl or aralkyl groups, $R^3$ and/or $R^6$ may also optionally not be present, the radicals $R^3$ and $R^6$ may also optionally form a bond (if m=o=1), to form a double bond, additionally the radicals $R^4$ and $R^5$ may be bridged cycloaliphatically or aromatically via the fragment T, m and o may independently of one another be 1 to 8 and preferably are 1, T represents a divalent alkylene or alkenylene radical (m=o=1), and the indices m and o and also the radicals T, $R^3$, $R^4$, $R^5$ and $R^6$ in each unit M11 may be identical or different,
where the units M1 to M11 may be arranged in any proportions, and blockwise, in alternation or at random, and may also have a distribution gradient, and where the units M1 to M4 in particular are freely permutable, with the provisos that i9 is >0, preferably from 0.1 to 100, more preferably from 0.5 to 50 and very preferably from 1 to 10, that at least one unit M5 or M6 is present and is adjoined at no end directly by a radical J and at each end by at least one unit selected from M1, M2 and M3, and that two units of the type M9 do not follow one another.

The radical J in formula (I) is preferably a hydrogen atom or a methyl or acetyl radical.

The sum total Σ i5 to i11 is preferably ≥i+1, preferably ≥i+2. More preferably the Σ i5+i6 is ≥i+1, preferably ≥i+2. The sum total Σ i1 to i11 is preferably ≥5, more preferably from 5 to 500 and very preferably from 10 to 150.

It may be advantageous if the compounds of the invention have exclusively those units which are based on the incorporation of ethylene oxide or propylene oxide, preferably ethylene oxide, as reactants suitable for ring-opening polymerization. With particular preference i1 and/or i2 are greater than 0.

The units M9 are preferably linked directly to a unit selected from M5, M6, M7 or M8.

The number of radicals J in the compound of the formula (I) is dependent on the number of branches, in other words on the number of units M5 and M6 and also on the indices i and k. The index i12 is dependent on the number of units with the index i5 and i6, and preferably satisfies the condition that i12=1+(i5+i6).

As substituents, the hydrocarbon radicals Z may preferably have halogens. As heteroatoms, the hydrocarbon radicals Z may have, in particular, nitrogen and/or oxygen, preferably oxygen. Particularly preferred hydrocarbon radicals Z have no substituents and no heteroatoms, and very preferably have 2 to 20 carbon atoms.

The unit M1, M2, M10 or M11, preferably M1 or M2, preferably forms in each case the last link in a chain of units.

The polydispersity ($M_w/M_n$) of the compounds of the formula (I) according to the invention, determined by GPC, is preferably <3.5, more preferably <2.5 and very preferably from >1.05 to <1.8.

The compounds of the formula (I) according to the invention have at least one branching generation, preferably at least two branching generations. The expression "generation" is used in the present case, as in WO 2002/040572 (US2004059086), to refer to pseudo-generations as well. The corresponding definition in WO 2002/040572 is hereby understood in full to be part of the disclosure content of the present specification.

The carbonate segments (M9) can be detected analytically by means of $^{13}$C-NMR and IR spectroscopy. In the $^{13}$C-NMR, signals can be seen in the 155-165 ppm region for the carbonyl carbon of the carbonate unit(s). In the IR it is possible to recognize the C=O absorptions of the carbonate vibration at wave numbers in the 1740-1750 cm$^{-1}$ region and possibly 1800-1810 cm$^{-1}$.

The $^{13}$C-NMR shifts of the branched polyethercarbonates can be evaluated by analogy with H. Frey et al., Macromolecules 1999, 32, 4240-4260. The corresponding definition from H. Frey et al. is hereby understood in full to be part of the disclosure content of the present specification.

By means of the compounds according to the invention, compositions of the invention are obtainable which comprise at least one compound of the formula (I) according to the invention. Besides the compounds of the formula (I) according to the invention, and also the further, optional components already specified above, the compositions of the invention may in particular have polyethers which have no —O—C(O)—O— structural unit. Where the compositions of the invention have not only compounds of the invention but also polyethers which have no —O—C(O)—O-structural unit, the molar fraction of compounds of the formula (I) of the invention to polyethers which have no —O—C(O)—O— structural unit is preferably from 0.001% to 70%, more preferably from 1% to less than 50%, based on the sum of compounds of the formula (I) according to the invention and polyethers which have no —O—C(O)—O— structural unit.

The compounds of the invention and also the compositions of the invention are obtainable, for example, by the process of the invention described above, or can be obtained by this process.

The compounds of the formula (I) according to the invention and the compositions of the invention can be employed for diverse applications. On account of the high density of functional groups, they can be employed for all applications in which associative interactions are important. Examples include the possible hydrogen bonding of the terminal OH groups of the branched structures.

The compounds of the invention or the compositions of the invention can be used, for example, as additive for ceramic formulations, as additive in coating materials, polymeric moulding compounds or thermoplastics, as food additive, as crosslinker and as additive for polyurethane compounds, in the production of paints, inks and adhesives, as support of catalysts, or in biomedicine generally. Furthermore, the compounds of the invention or the compositions of the invention can be used as surface-active substances, such as, for example, as nonionic surfactants, emulsifiers or wetting agents. Their use as lubricants or a lubricant additive is also conceivable. As additives for influencing the viscosity of formulations, their use as thickeners is likewise possible. Their use as adjuvant for cosmetic formulations and cleaning compositions is likewise possible.

Figures:

The present invention is elucidated in more detail by FIG. 1, without any intention that the invention should be confined to the embodiment shown therein.

FIG. 1 shows the IR spectrum of the branched polyethercarbonate prepared according to Example 1. The bands at wavenumbers of approximately 1745 and 1805 are assignable to the CO units (M9).

Measurement Methods:

Parameters or measurement values are determined using preferably the methods described below. More particularly, these methods were used in the examples of the present patent.

The amounts of branches can be verified, for example, by NMR analysis or MALDI-T of analyses.

The NMR spectra were recorded using a 400 MHz spectrometer from Bruker, employing a 5 mm QMP head. Quantitative NMR spectra were recorded in the presence of a suitable accelerating agent. The sample for analysis was dissolved in a suitable deuterated solvent (methanol, chloroform) and transferred to 5 mm or, where necessary, 10 mm NMR tubes.

MALDI-T of analyses were carried out using a Shimadzu Biotech Axima®(CFR 2.8.420081127) instrument in "Reflectron" mode. Pulse Extraction was optimized for a molar weight of 1000 g/mol. The sample was dissolved in chloroform (4-5 g/l), and 2 μl of this solution were applied to a graphite matrix.

The carbonate segments (M9) can be verified by $^{13}$C-NMR analyses or, preferably, by IR spectroscopy. In the case of IR spectroscopy, the M9 units can be verified by bands at wavenumbers of approximately 1745 and possibly approximately 1805.

The IR analyses were measured using the Tensor® 27 IR spectrometer from Bruker Optics in accordance with the abandoned total reflection method, on a diamond. The resolution was 4 cm$^{-1}$, and 32 sample scans were run.

For the purposes of this invention, weight-average and number-average molecular weights for the polyethercarbonates prepared are determined by gel permeation chromatography (GPC) with calibration against a polypropylene glycol standard (76-6000 g/mol). The GPC was carried out on an Agilent® 1100 equipped with an IR detector and an SDV 1000/10000 Å column combination consisting of a 0.8 cm×5 cm preliminary column and two 0.8 cm×30 cm main columns, at a temperature of 30° C. and with a flow rate of 1 ml/min (mobile phase: THF). The sample concentration was 10 g/l and the injection volume was 20 µl.

Wet-chemical analysis was carried out in accordance with international standard methods: iodine number (IN; DGF C-V 11 a (53)); acid number (AN; DGF C-V 2); OH number (ASTM D 4274 C).

The examples set out below describe the present invention in an exemplary fashion, without any intention that the invention, whose breadth of application is evident from the overall description and from the claims, should be confined to the embodiments given in the examples.

Example 1

Preparation of an Unsaturated, Branched, Purely EO-Containing Polyethercarbonate A 5 liter autoclave was charged with 138 g of allyl alcohol and 12.9 g of sodium methoxide, under nitrogen, and evacuated down to an internal pressure of 30 mbar. With stirring, the reaction mixture was heated to 115° C. and 691 g of ethylene oxide (EO) were added on at this temperature. Following quantitative reaction of the EO, the contents of the reactor were deodorized by evacuation to 30 mbar in order to remove any traces of unreacted EO. The temperature was then raised to 170° C. and 622 g of glycerol carbonate were metered in continuously over a period of 2 hours. Following an approximately two-hour after-reaction, the reaction mixture was cooled to 115° C. and a further 1009 g of EO were added on. After a one-hour after-reaction, the mixture was deodorized and neutralized with 25% strength phosphoric acid. The branched polyethercarbonate obtained had an OH number of 183.1 mg KOH/g and an IN of 24.2 mg 12/100 g. According to GPC, $M_p$=444 g/mol, $M_w$=776 g/mol, $M_n$=507 g/mol and $M_w/M_n$=1.5.

Example 2

Preparation of an Unsaturated, More Highly Branched, Purely EO-Containing Polyethercarbonate A 5 liter autoclave was charged with 119.6 g of allyl alcohol and 11.1 g of sodium methoxide, under nitrogen, and evacuated down to an internal pressure of 30 mbar. With stirring, the reaction mixture was heated to 115° C. and 599.5 g of EO were added on at this temperature. Following quantitative reaction of the EO, the contents of the reactor were deodorized by evacuation to 30 mbar in order to remove any traces of unreacted EQ. The temperature was then raised to 170° C. and 1071 g of glycerol carbonate were metered in continuously over a period of 2 hours. Following an approximately three-hour after-reaction, the reaction mixture was cooled to 115° C. and a further 1434 g of EO were added on. After a one-hour after-reaction, the mixture was deodorized and neutralized with 25% strength phosphoric acid. The branched polyethercarbonate obtained had an OH number of 205.3 mg KOH/g and an IN of 16.8 mg $I_2$/100 g. According to GPC, $M_p$=456 g/mol, $M_w$=885 g/mol, $M_n$=545 g/mol and $M_w/M_n$=1.62.

Example 3

Preparation of an Unsaturated, Branched, EO- and PO-Containing Polyethercarbonate A 5 liter autoclave was charged with 116.9 g of allyl alcohol and 10.9 g of sodium methoxide, under nitrogen, and evacuated down to an internal pressure of 30 mbar. With stirring, the reaction mixture was heated to 115° C. and 585.9 g of ethylene oxide were added on at this temperature. Following quantitative reaction of the EO, the contents of the reactor were deodorized by evacuation to 30 mbar in order to remove any traces of unreacted EO. The temperature was then raised to 170° C. and 526.8 g of glycerol carbonate were metered in continuously over a period of 2 hours. Following an approximately two-and-a-half-hour after-reaction, the reaction mixture was cooled to 115° C. and 1157.3 g of propylene oxide (PO) were added on. After a one-hour after-reaction, the mixture was deodorized and neutralized with 25% strength phosphoric acid. The branched polyethercarbonate obtained had an OH number of 175.7 mg KOH/g and an IN of 21.5 mg $I_2$/100 g. According to GPC, $M_p$=517 g/mol, $M_w$=875 g/mol, $M_n$=579 g/mol and $M_w/M_n$=1.5.

Example 4

Preparation of a Saturated, Branched, EO-Containing Polyethercarbonate

A 5 liter autoclave was charged with 92.8 g of butanol and 13.2 g of potassium methoxide, under nitrogen, and evacuated down to an internal pressure of 30 mbar. With stirring, the reaction mixture was heated to 115° C. and 331 g of ethylene oxide were added on at this temperature. Following quantitative reaction of the EO, the contents of the reactor were deodorized by evacuation to 30 mbar in order to remove any traces of unreacted EO. The temperature was then raised to 170° C. and 443 g of glycerol carbonate were metered in continuously over a period of 2 hours. Following an approximately two-hour after-reaction, 662 g of EO were added on, again at 170° C. After a one-hour after-reaction, deodorization was repeated and a further 295 g of glycerol carbonate were metered in over a period of 2 hours. Following a three-hour after-reaction, finally, 662 g of EO were added on, and after a one-hour after-reaction, the mixture was deodorized and neutralized with 25% strength phosphoric acid. The branched polyethercarbonate obtained had an OH number of 182.9 mg KOH/g. According to GPC, $M_p$=529 g/mol, $M_w$=1068 g/mol, $M_n$=506 g/mol and $M_w/M_n$=2.1.

Example 5

Preparation of a Saturated, Branched, EO-Containing Polyethercarbonate

A 5 liter autoclave was charged with 119 g of diethylene glycol and 9.4 g of potassium hydroxide, under nitrogen, and evacuated down to an internal pressure of 30 mbar. With stirring, the reaction mixture was heated to 115° C. and 566 g of ethylene oxide were added on at this temperature. Following quantitative reaction of the EO, the contents of the reactor were deodorized by evacuation to 30 mbar in order to remove any traces of unreacted EO. The temperature was then raised to 170° C. and 596 g of glycerol carbonate were metered in continuously over a period of 2 hours. Following an approximately two-and-a-half-hour after-reaction, 1224 g of EO were added on, again at 170° C. Following a one-hour after-reaction, deodorization was repeated and neutralization was carried out with 25% strength phosphoric acid. The branched polyethercarbonate obtained had an OH number of 176 mg KOH/g. According to GPC, $M_p$=753 g/mol, $M_w$=1099 g/mol, $M_n$=649 g/mol and $M_w/M_n$=1.69.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A process for preparing branched polyethers, comprising:
   (a) reacting a starter of the general formula (II) with one or more reactants suitable for ring-opening polymerization selected from the group consisting of alkylene oxides, glycidyl ethers, lactones and cyclic acid anhydrides, to obtain a first reaction mixture,
   wherein formula (II) is:

$$Z(X\text{---}H)_j \qquad (II);$$

where:
   X=independently at each occurrence O, NH, N-alkyl, N-aryl or S;
   j=1-3; and
   Z=any organic radical, selected from a saturated or unsaturated alkyl radical, an aryl radical, or an aralkyl radical, with each X being linked to a carbon atom of the organic radical;
   (b) reacting the first reaction mixture obtained in step (a) with glycerol carbonate to obtain a second reaction mixture;
   wherein the glycerol carbonate is added at a rate of 0.1 to 10 mol/h, in each case per mol of (XH) in the starters used; and
   (c) reacting the second reaction mixture obtained in step (b) with one or more reactants suitable for ring-opening polymerization
   wherein the branched polyethers have at least one structural unit —O—C(O)—O—.

2. The process according to claim 1;
   wherein the reaction in steps (a) and (c) is an alkoxylation.

3. The process according to claim 1;
   wherein the starter (II) is a saturated or unsaturated alkyl compound, an aryl compound, or an aralkyl compound; and
   wherein:
   X=O; and
   j=1 to 3.

4. A compound of the formula (I):

   (I)

where:
   i=1 to 10;
   k=0 to 9;
   i+k=1 to 10;
   i1 to i12=each independently of one another 0 to 100;
   X=identically or differently O, NH, N-alkyl, N-aryl, or S, Z=any desired organic radical, with each X being linked to a carbon atom of the organic radical;

J=independently at each occurrence is selected from the group consisting of:
   hydrogen;
   a linear, cyclic, or branched, aliphatic or aromatic, saturated or unsaturated hydrocarbon radical having 1 up to 30 C atoms;
   a carboxylic acid radical having 1 to 30 carbon atoms; and
   a functional, organic, saturated or unsaturated radical substituted by heteroatoms;

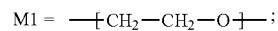

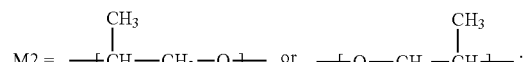

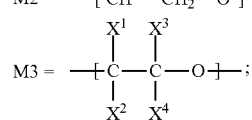

where, in M3, $X^1$ to $X^4$ are each independently of one another:
   hydrogen; or
   a linear, cyclic, or branched, aliphatic or aromatic, saturated or unsaturated hydrocarbon radical having 1 to 50 C atoms, and may optionally contain halogen atoms;
   with the proviso that $X^1$ to $X^4$ are not selected such that M3 is the same as M1 or M2,

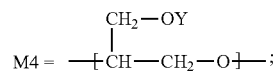

where Y independently at each occurrence is a linear, cyclic, or branched, aliphatic or aromatic, saturated or unsaturated hydrocarbon radical having 2 to 30 C atoms, and optionally contain heteroatoms;

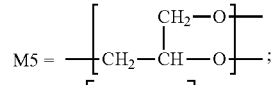

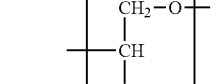

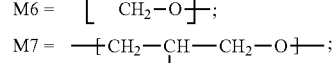

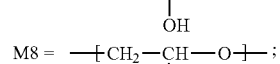

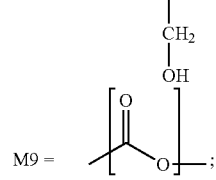

-continued

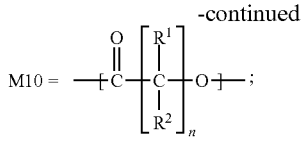

where $R^1$ and $R^2$ are each independently of one another either:
hydrogen or
an alkyl, alkoxy, aryl, or aralkyl group; and
n independently in each of unit M10 is 3 to 8; and
$R^1$ and $R^2$ in each unit M10 are identical or different;

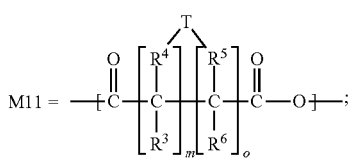

where:
$R^3$, $R^4$, $R^5$, and $R^6$ are each independently of one another hydrogen or an organic radical;
T may or may not be present; and
m and o are each independently of one another 1 to 8;
with the proviso that $R^3$ and $R^6$ optionally form a bond; and
with the proviso that, when $R^4$ and $R^5$ are each a hydrocarbon radical, the radicals $R^4$ and $R^5$ optionally are bridged cycloaliphatically or aromatically via the fragment T, where T represents either a divalent alkylene or alkenylene radical which is optionally further substituted; and
where the indices m and o and the radicals T, $R^3$, $R^4$, $R^5$, and $R^6$ in each unit M11 are identical or different;
where the units M1 to M11 may be arranged in any proportions, and, blockwise, in alternation or at random, and optionally also have a distribution gradient; and
where the units M1 to M4 in particular are freely permutable;
with the provisos that:
i9 is 0, 1 to 100;
at least one unit M5 or M6 is present and is adjoined at no end directly by a radical J and at each end by at least one unit selected from M1, M2 and M3; and
two units of the type M9 do not follow one another.

5. The compound according to claim 4;
wherein the radical J in formula (I) is a hydrogen atom, or a methyl or acetyl radical.
6. The compound according to claim 4;
wherein the sum total Σi5 to i9 is ≥i+1.
7. The compound according to claim 4;
wherein:
i1 is greater than 0; and
i2, i3, and i4 are each 0.
8. The compound according to claim 4;
wherein Σ i5+i6 is ≥i+1.
9. The compound according to claim 4;
wherein the unit M9 is linked directly to the unit M5, M6, M7, or M8.
10. A composition comprising:
the compound according to claim 4.
11. A method of obtaining the compound according to claim 4, comprising:
(a) reacting a starter of the general formula (II) with one or more reactants suitable for ring-opening polymerization to obtain a first reaction mixture, wherein formula (II) is:

$$Z(X—H)_j \qquad (II);$$

where:
X=independently at each occurrence O, NH, N-alkyl, N-aryl or S;
j=1-10; and
Z=any organic radical, with each X being linked to a carbon atom of the organic radical;
(b) reacting the first reaction mixture obtained in step (a) with glycerol carbonate to obtain a second reaction mixture; and
(c) reacting the second reaction mixture obtained in step (b) with one or more reactants suitable for ring-opening polymerization.
12. A method comprising:
utilizing the compound according to claim 4 as a surface-active substance, as an additive for ceramic formulations, as an additive in coating materials, polymeric moulding compounds, or thermoplastics, as a food additive, as a crosslinker, as a thickener, as an additive for polyurethane compounds, as a support of catalysts, or as an adjuvant for cosmetic formulations or cleaning compositions; or
utilizing the compound according to claim 4 in the production of paints, inks, or adhesives, or in biomedicine.
13. The process as claimed in claim 1, wherein the glycerol carbonate is added at a rate of 0.5 to 5 mol/h.
14. The process as claimed in claim 1, wherein the glycerol carbonate is added a rate of 1 to 2.5 mol/h.

* * * * *